Nov. 1, 1927.

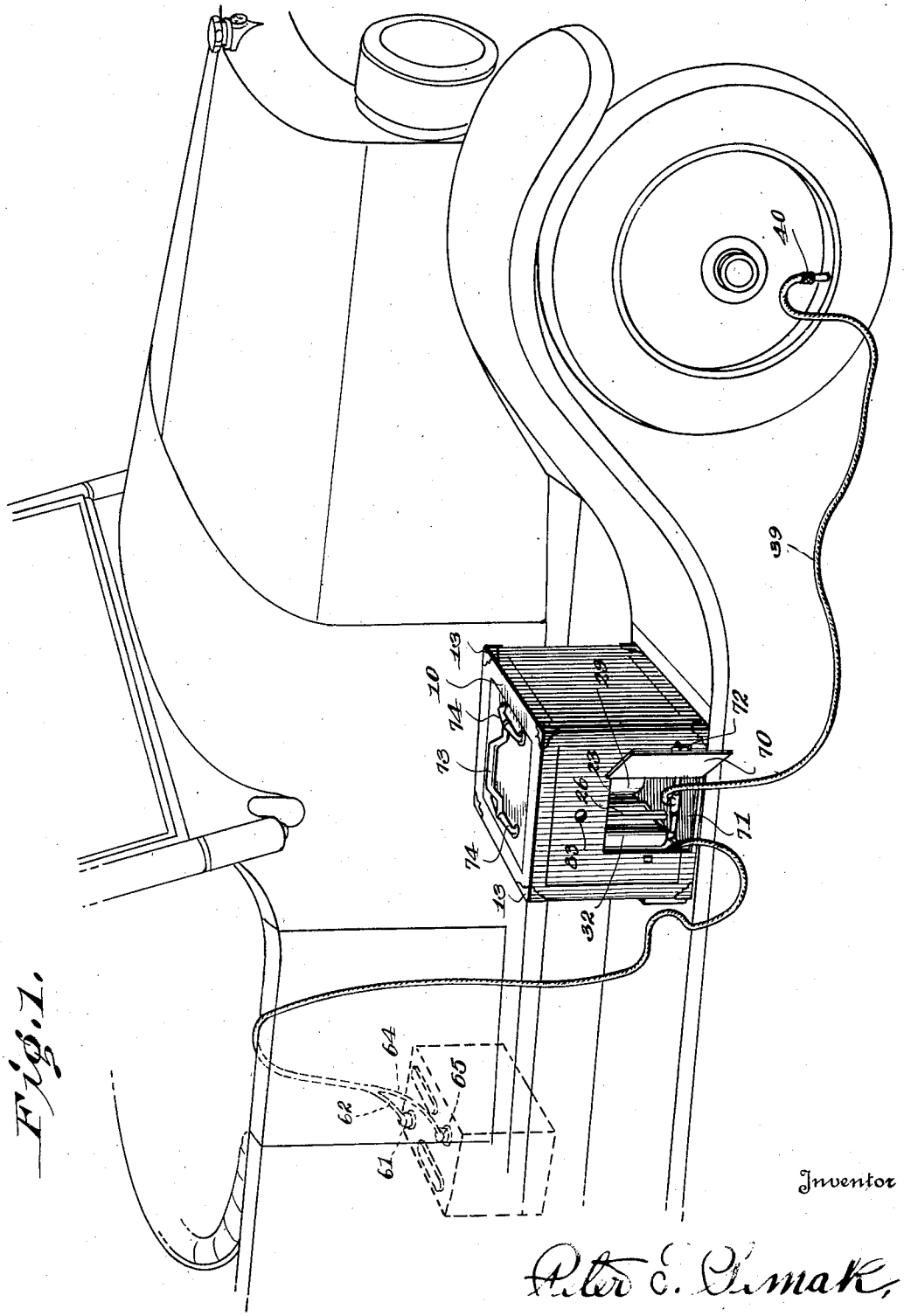

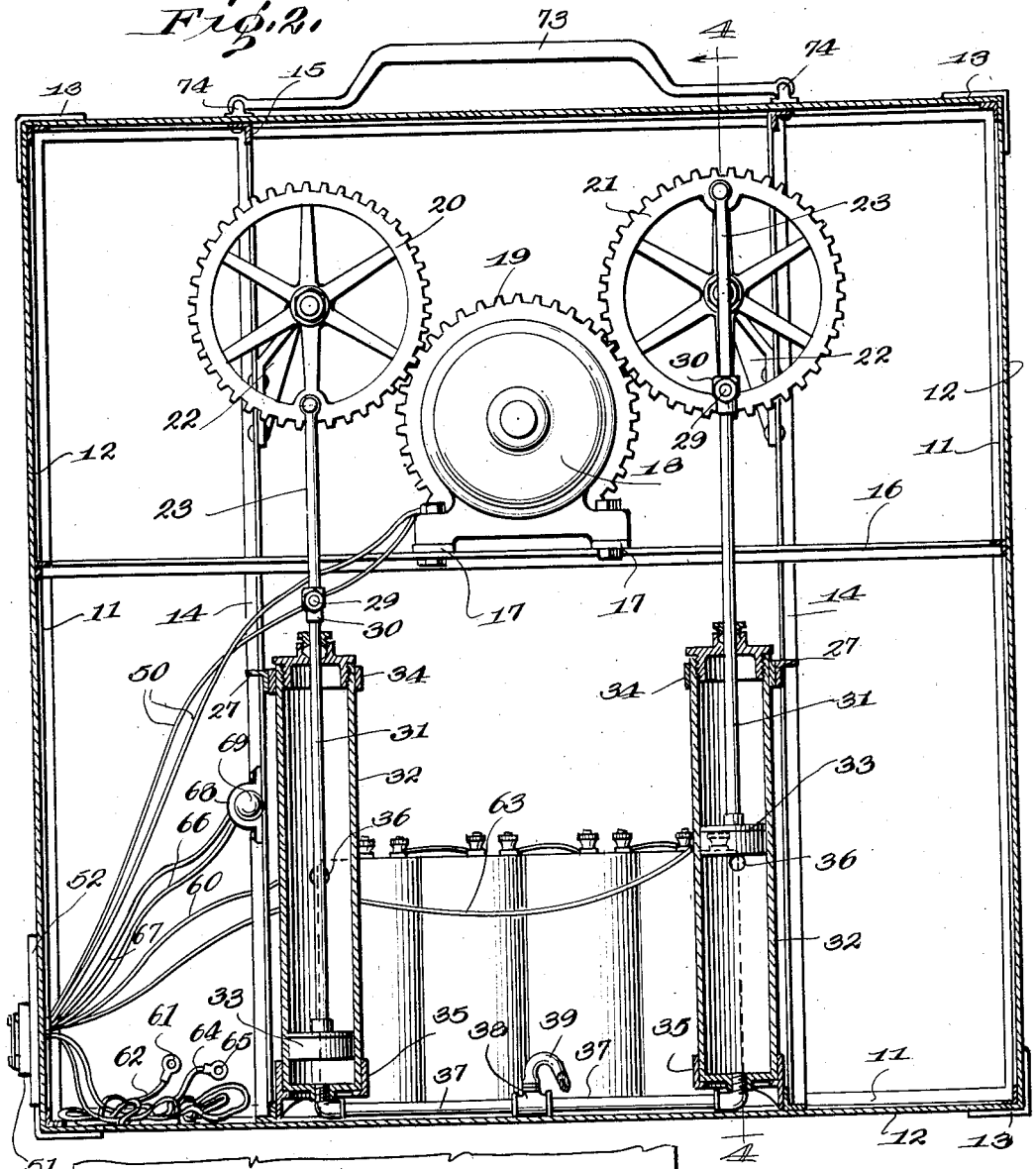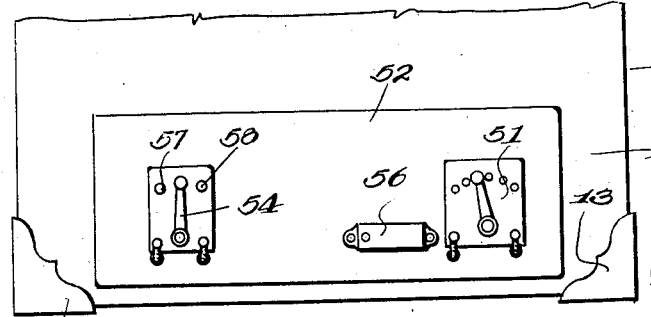

P. I. SEMAK 1,647,818

TIRE INFLATING DEVICE

Filed Nov. 10, 1925    3 Sheets-Sheet 3

Inventor

Peter I. Semak

Patented Nov. 1, 1927.

1,647,818

UNITED STATES PATENT OFFICE.

PETER I. SEMAK, OF MONONGAHELA, PENNSYLVANIA.

TIRE-INFLATING DEVICE.

Application filed November 10, 1925. Serial No. 68,101.

The present invention relates to an apparatus for inflating the tires of an automobile or the like, and aims to provide a novel and improved device of this character which can be conveniently carried by an automobile for efficiently inflating the tires thereof in case of tire trouble should a service station be beyond reach.

Another object of the invention is the provision of a box-like casing which can be arranged upon the running board of an automobile, said casing having an electric motor arranged therein which may be driven from the battery of the automobile if desired, a pair of air pumps operated by said motor, and a flexible tube connected to said pumps and for connection with any one of the tires of the automobile for inflating the same.

It is also an object of the invention to provide a device of the above indicated character, which is simple and substantial in construction, which can be manufactured economically, and which will be thoroughly efficient and practical in use.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

Figure 4:
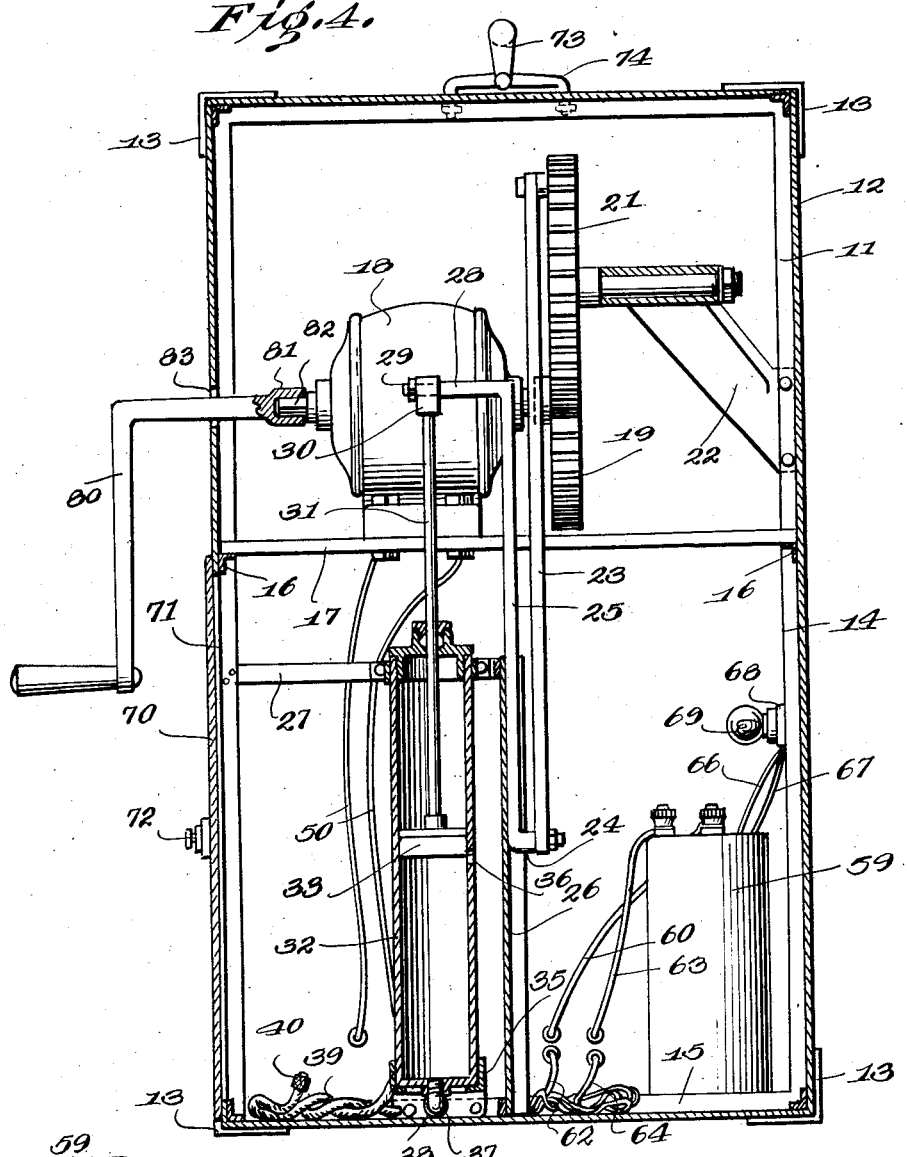
Figure 5:
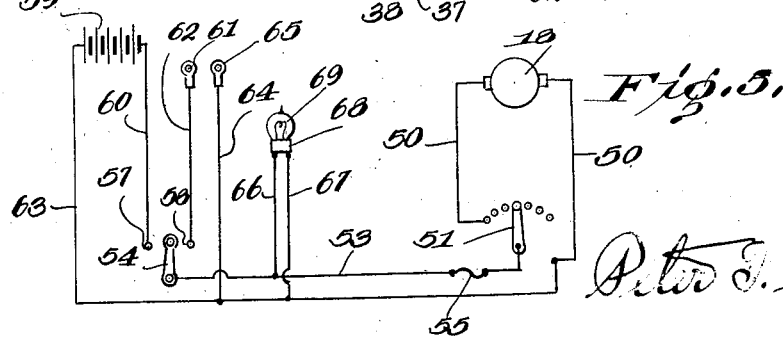

The invention is illustrated in the accompanying drawings, wherein:

Figure 1 is a perspective view of a portion of an automobile showing my improved apparatus applied, Figure 2 is a vertical longitudinal section taken through the apparatus, Figure 3 is a fragmentary end view of same, Figure 4 is a vertical section taken on line 4—4 of Figure 3, and Figure 5 is a wiring diagram of the device.

In carrying out the invention, the numeral 10 designates a box-like casing, which is constructed of a series of angled members 11 arranged at the corners of the casing and which have attached thereto metallic sheeting 12 forming the walls of the casing. At each corner of the casing on the outside thereof is arranged a corner member 13 for protecting the casing against destruction. On the interior of the casing are arranged additional angled members 14 positioned in a vertical direction and which have the opposite ends thereof connected to angled members 15 extending along the upper and lower walls of the casing. In addition to the members 14 and 15, there is also arranged additional angled members 16 which extend around and engage the interior of the casing for further supporting the same.

Extending across the casing between a pair of the horizontal angled members 16 are arranged a pair of bars 17 which support an electric motor 18. The electric motor has arranged on the drive shaft thereof a relatively large gear 19 which meshes with a pair of gears 20 and 21. The gears 20 and 21 are supported in rotary movement by a pair of brackets 22 which are connected to a pair of the vertical angled members 14.

Attached to the gears 20 and 21 are the upper ends of a pair of connecting links 23, which have the lower ends thereof connected to angled extensions 24 provided upon the lower ends of slidable members 25. The members 25 are mounted in channel irons 26 for sliding movement, said channel irons being secured at their lower ends to the lower angled members 15, while their upper ends are attached or secured to inwardly extending angled members 27 attached to the vertical angled members 14 arranged upon the front wall of the casing. The slidable members 25 have angled extensions 28 arranged upon their upper ends which are provided with reduced shanks 29 which extend through lock members 30 arranged upon the upper ends of plunger shafts 31. The plunger shafts 31 extend downwardly into cylinders 32 and have plungers 33 arranged upon their lower ends for reciprocatory movement in said cylinders. The cylinders 32 are supported at their upper ends by bracket members 34 which are attached to the inwardly extending angled members 27, while their lower ends are received in cup-shaped brackets 35 attached to the angled members 15. Arranged in each of the cylinders 32 is an opening 36 for permitting air to enter the cylinders as the plungers are reciprocated.

Attached to the lower end of each cylinder is one end of a pipe 37 which is in communication with said cylinders. The pipe 37 has a T joint 38 arranged thereon intermediate its ends, which in turn has attached thereto a flexible hose or tubing 39 of considerable length. The hose or tubing 39 has arranged upon its opposite end the usual cap 40 for attachment with the valve stems of the tubes of the tires.

Leading from the electric motor 18 is a pair of wires 50 which are connected to a switch structure 51 mounted upon a board 52 arranged upon the outside of the casing at one end thereof. A wire 53 extends from the movable member of the switch structure 51 to the movable member of another switch structure 54 and has interposed therein a fuse 55, said fuse being arranged in a casing 56. The movable member of the switch structure 54 is adapted to engage a pair of contacts 57 and 58, the contact 57 leading to a series of dry cells 59 arranged in the casing through a wire 60, while the contact 58 connects with a connection member 61 through a wire 62. A wire 63 extends from the opposite terminal of the dry cells 59 and is connected to the switch structure 51. A branch wire 64 is attached from the wire 63 and has a connection member 65 arranged thereon, while a pair of wires 66 and 67 are tapped from the wires 53 and 63 respectively and lead to an electric light socket 68 carrying an electric bulb 69. By providing the wires 62 and 64 and the connection members 61 and 65, current may be supplied to the electric motor 18 by attaching the connection members 61 and 65 with the opposite poles of the storage battery of the automobile to which my device is associated. By operating the switch 54, current may be either supplied from the dry cells or the storage battery. The electric light socket 68 and bulb 69 are arranged in the casing so as to illuminate the same should it be desired to operate the device during darkness.

On the front wall of the casing is arranged a door 70 for closing an opening 71 arranged in said front wall, said door being hingedly connected to the front wall and having a latch structure 72 arranged thereon for holding the door in a closed position. During operation of my device, the door is opened so as to permit the flexible tubing or hose 39 to extend out through the opening 71 for connection with any one of the tires of the automobile. The opening 71 also permits the wires 62 and 64 to extend therethrough for attachment to the terminals of the storage battery arranged in the automobile.

In order that my improved device may be carried from place to place, I have provided a handle 73, which has its opposite ends attached to brackets 74, which in turn are secured to the angled members 15 arranged under the top wall of the casing. When the device is carried on the running board of an automobile, screws may be inserted through the running board and through openings provided in certain of the angled members in order to rigidly secure the device to the running board and prevent the same from bouncing off while the automobile is traveling over rough ground.

In operation, the cap 40 arranged upon the free end of the hose or flexible tubing 39 is connected to the valve stem of the tire to be inflated and the switch 54 operated according to whether it is desired to drive the motor 18 from the dry cells 59 or the storage battery of the automobile. When the storage battery of the automobile is to be used, it is necessary to connect the connection members 61 and 65 to the terminals of the storage battery. The switch 51 is then operated which closes a circuit to the motor 18, causing the same to revolve which in turn rotates the gears 20 and 21, due to the gear 19 carried by the electric motor meshing therewith. As the gears 20 and 21 rotate, the slidable members 25 are moved up and down in the channel members 26 by the connecting links 23 which are pivotally connected to the gears 20 and 21 and to the lower end of said slidable member. The reciprocating of the slidable members 25 will cause the plungers 33 to be reciprocated in the cylinders 32, as the upper ends of the slidable members are attached to the upper ends of the plunger shafts 31. As the plungers 33 are reciprocated in the cylinders, air is compressed in the lower ends of said cylinders and forced into the pipe 37 from which it passes into the flexible tubing or hose 39 and to the tire to be inflated. It will be noted that the connecting links 23 are connected to the gears 20 and 21 so that upon downward movement of one plunger 33, the other plunger is moved in an upward direction, thus causing a continuous flow of air through the tube 39. When the device is not in use, the flexible tubing or hose 39 is placed within the casing together with the wires 62 and 64 for connection with the storage battery, thus providing a structure which will be neat in appearance during travel of the vehicle.

Should electric current not be available, I have provided a hand crank 80 provided with a socket 81 thereon arranged for engaging a squared extension 82 formed on the drive shaft of the electric motor 18 by inserting the socket portion of said crank through an opening 83 provided in the front wall of the casing. It can be seen that by turning the crank 80 that the drive shaft of the electric motor 18 will also be turned, thus operating the device the same as if the electric motor was operated by electricity. As shown in the drawings, the crank 80 may be removed or disconnected from the electric motor 18 when it is not desired to use same.

Having thus described my invention, what I claim as new is:

A tire inflating apparatus comprising a support, a motor mounted thereon, a pair of gear wheels journaled upon the support, means operatively connected with said gear wheels and with the shaft of the motor, a pair of cylinders located upon said support, a channel iron for forming a guide member arranged to the side of each cylinder, a piston slidably mounted in each cylinder, a connecting rod connected to each piston, a pitman rod eccentrically connected with each gear wheel, said pitman rods being arranged so as to move in opposite directions, and two link members, each one being slidably received in each of said channel irons, each of said link members having rectangularly and oppositely disposed end portions one of which is connected with a piston rod and the other with a pitman rod, said link members, channel irons, and pitman rods being arranged and associated with relation to said gear wheels so that the side walls of said channel irons support the link members against side strain caused by eccentrically connecting the pitman rods to the gear wheels.

In testimony whereof, I have affixed my signature.

PETER I. SEMAK.